United States Patent [19]

Hirobe et al.

[11] Patent Number: 5,206,696
[45] Date of Patent: Apr. 27, 1993

[54] IMAGE FORMING APPARATUS PROVIDED WITH A MOVABLE DOCUMENT TABLE

[75] Inventors: Junichi Hirobe, Kadoma; Masakatsu Akashi, Kakogawa; Masahiko Kobayashi, Ikoma; Tsutomu Sugaya, Hirakata, all of Japan

[73] Assignee: Mita Industrial Co., Ltd., Osaka, Japan

[21] Appl. No.: 848,555

[22] Filed: Mar. 9, 1992

[30] Foreign Application Priority Data

Mar. 12, 1991 [JP] Japan ................................ 3-046444
Mar. 12, 1991 [JP] Japan ................................ 3-046445

[51] Int. Cl.[5] ........................................ G03G 15/28
[52] U.S. Cl. .................................... 355/234; 355/233; 355/75
[58] Field of Search ............... 355/200, 232, 233, 234, 355/75

[56] References Cited

U.S. PATENT DOCUMENTS

| | | | |
|---|---|---|---|
| 4,108,544 | 8/1978 | Mitsuyama et al. | 355/234 |
| 4,575,223 | 3/1986 | Shimono et al. | 355/234 |
| 4,764,788 | 8/1988 | Watashi et al. | 355/234 X |
| 4,891,665 | 1/1990 | Mizutani | 355/234 X |
| 5,066,975 | 11/1991 | Nakanishi et al. | 355/200 |
| 5,113,224 | 5/1992 | Tsuda et al. | 355/234 |

Primary Examiner—A. T. Grimley
Assistant Examiner—Matthew S. Smith
Attorney, Agent, or Firm—Jordan and Hamburg

[57] ABSTRACT

An image forming apparatus includes a main body having an image forming device, a document table for holding the document, the table being movable reciprocatingly to the left and right sides of the apparatus when viewed from front over an upper surface of the main body, a drive device for moving the document table, and a movement control device for mechanically executing at least one operation of switching a moving direction of the document table and locking the document table in a predetermined position. Accordingly, there can be obviated the need for providing expensive electronic parts for switching the moving direction of the document table, stopping and locking the document table. Therefore, the image forming apparatus can be manufactured at lower costs.

19 Claims, 22 Drawing Sheets

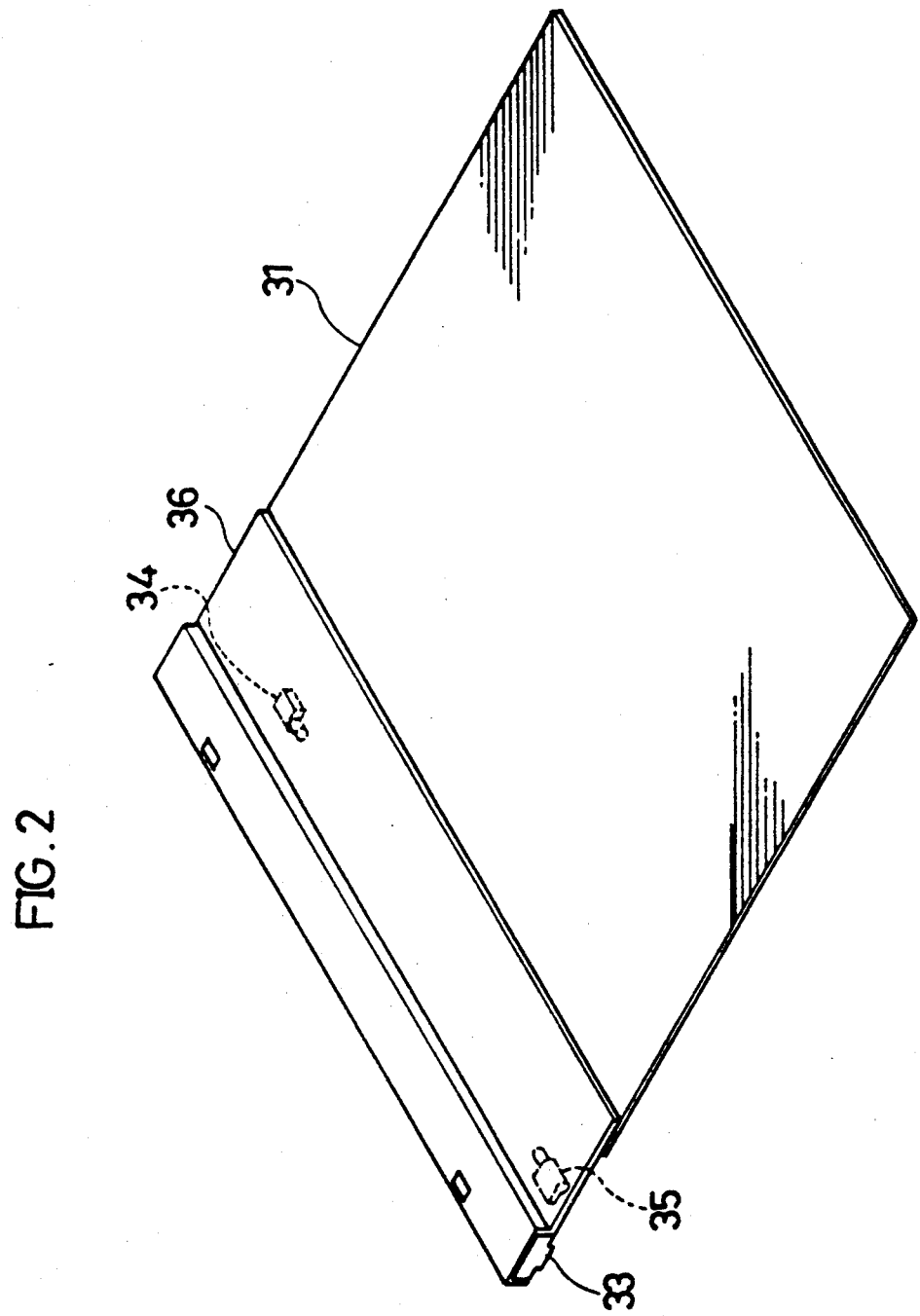

FIG.10A
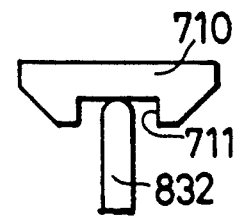
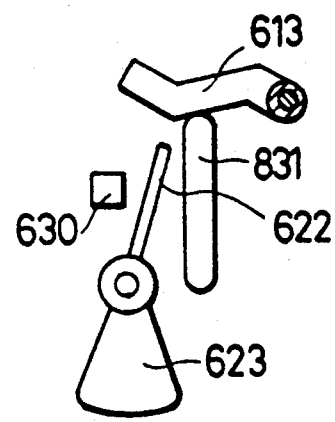
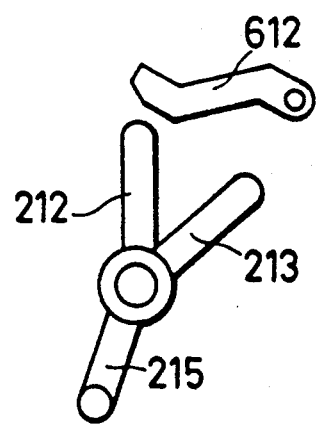

FIG.10C
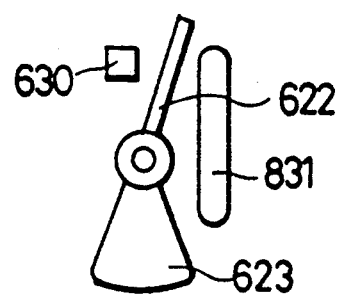
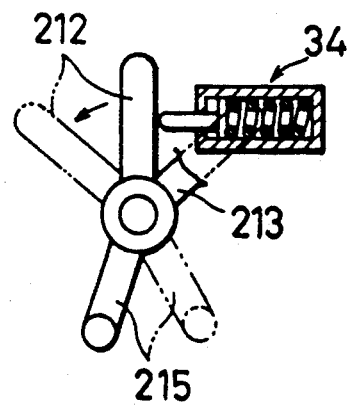

FIG. 10D
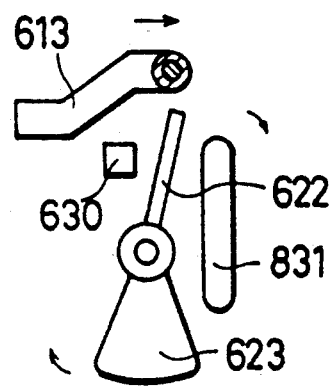
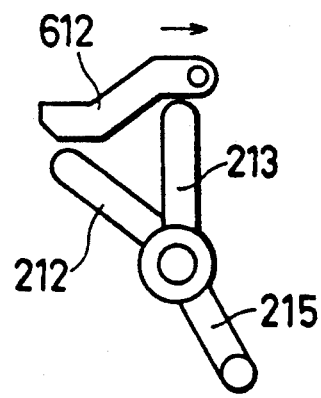

FIG.10E
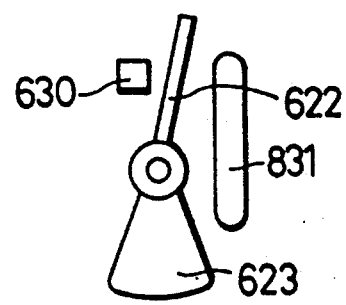
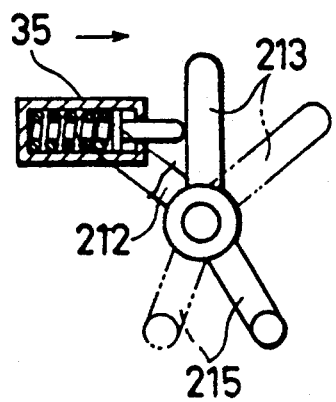

FIG.10F
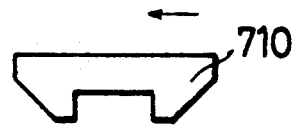
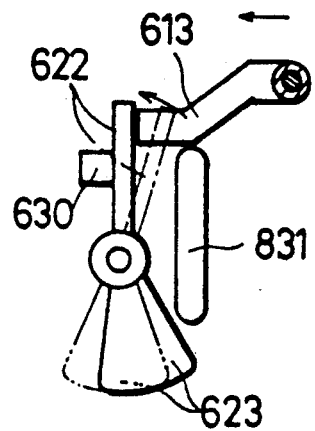
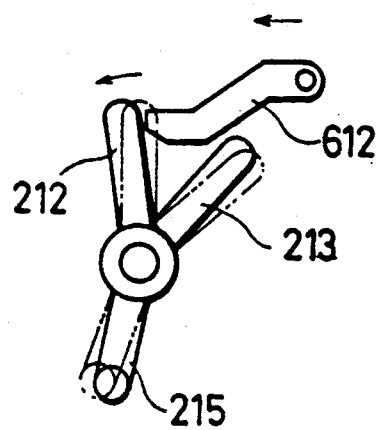

IMAGE FORMING APPARATUS PROVIDED WITH A MOVABLE DOCUMENT TABLE

BACKGROUND OF THE INVENTION AND RELATED ART STATEMENT

This invention relates to an image forming apparatus provided with a document table movable reciprocatingly to the left and right along a lengthwise direction thereof, and thereby a document placed on the document table is exposed.

Copying machines or like image forming apparatus are categorized into two types in the light of document exposing method: one is an image forming apparatus provided with a movable optical system; and the other is an image forming apparatus provided with a movable document table. In these apparatus, the optical system or document table moves horizontally to expose a document. In the image forming apparatus provided with a movable document table, when a copying operation is instructed after a document is set in the document table, the document table moves in a specified direction from a home position so as to expose the document. Upon completion of exposure of the document, the document table is returned to the home position, whereupon a movement control of the document table is released and the document table is allowed to make free movement.

Recently, there has been an increasing demand for an image forming apparatus which can be readily and easily used at home. In order to meet this demand, the image forming apparatus requires to be manufactured small-sized, light-weighted, and at lower costs. In this aspect, the image forming apparatus provided with a movable document table is more suitable for home use than the one provided with a movable optical system.

In the image forming apparatus provided with a movable document table, it is required that movement of the document table to the left and right be controlled. In a conventional large-sized apparatus of this type, sensor switches are provided in specified positions on the left and right side portions of the apparatus. It is detected in accordance with ON and OFF sensor signals from the sensor switches that the document table has reached the left or right specified position, and then a moving direction of the document table is reversed with the use of an electromagnetic spring clutch. In other words, the movement of the document table is controlled electrically. However, the electric control requires at least a sensor switch and electromagnetic spring clutch. These parts, being expensive, cause an increase in manufacturing cost of the image forming apparatus. Further, these electric parts require wiring for connecting them, which necessarily increases the manufacturing cost. Accordingly, in manufacturing a low cost image forming apparatus for home use, it is not suitable to control movement of the document table electrically.

If an image forming apparatus provided with a movable document table is manufactured small-sized and light-weighted, an installation place thereof can be readily changed and a main body thereof can be easily inclined in case of, for example, removing a jammed copy sheet. However, it is necessary to prevent the document table from moving freely in the case where the installation place of the apparatus is changed or the main body thereof is inclined. If the document table is allowed to move freely with the inclination of the apparatus main body, the unexpectedly moved document table may break the apparatus or hurt an operator.

Moreover, it is preferable to stop the document table in a center position of the image forming apparatus since the document table can be stably and reliably supported on the apparatus main body. However, in this case, the document table is more liable to move to the left and right. Accordingly, it is even more necessary to prevent the document table from moving freely. An electric control may be executed so as to lock the document table in a predetermined position. However, as described above, the use of electric parts necessarily causes an increase in manufacturing cost.

In addition, the document table should be stopped in the predetermined position upon completion of the copying operation. It is exceedingly difficult to stop the document table in the predetermined position only by stopping a drive motor for moving the document table. In consideration of the inertia of the document table in motion, a very complicated calculation should be carried out to obtain a stop timing of the drive motor so as to stop the document table in the predetermined position. However, a microcomputer capable of performing complicated calculations cannot be provided in the image forming apparatus for home use which requires to be manufactured at a reduced cost. Therefore, it is necessary to provide stop means for stopping the document table in the predetermined position which is simple in construction and manufactured at low costs.

In view of the above problems, it is an object of the present invention to provide an image forming apparatus provided with a movable document table which is simple in construction and manufactured at low costs.

SUMMARY OF THE INVENTION

Accordingly, an image forming apparatus of the invention comprises a main body having an image forming means, a document table for holding the document, the table being movable reciprocatingly to the left and right sides of the apparatus when viewed from front over an upper surface of the main body, drive means for moving the document table, and movement control means for mechanically executing at least one operation of switching a moving direction of the document table and locking the document table in a predetermined position.

It may be advantageous that the drive means includes a drive motor rotatable in a specified direction and conversion mechanism for converting the torque of the drive motor into the driving force for moving the document table to the left or right side, and that the movement control means includes switch means for causing the conversion mechanism to convert the torque of the drive motor into movement of the document table to the left from that of the document table to the right when the document table moves to the left up to a first predetermined position, and to convert the torque of the driving motor into movement of the document table to the right from that of the document table to the left when the document table moves to the right up to a second predetermined position.

Further, the conversion mechanism may include a drive portion operable in association with the drive motor, and a left movement drive portion and a right movement drive portion operable in association with the drive portion. Also, the switch means may include a clutch mechanism provided between the drive portion and left movement drive portion and between the drive portion and right movement drive portion for coupling the drive portion with either the left or right movement drive portion, a toggle mechanism operable in association with the clutch mechanism, the toggle mechanism having a first position and a second position, and a switch member for switching the position of the toggle mechanism. The clutch mechanism couples the drive portion with the left movement drive portion when the toggle mechanism is switched to the first position by the switch member, and couples the drive portion with the right movement drive portion when the toggle mechanism is switched to the second position by the switch member.

Moreover, the switch member may have a first direction switching member provided at a right end of the document table and a second direction switching member provided at a left end of the document table. The toggle mechanism is switched to the second position when the document table moves to the left and the first direction switching member comes into contact with the toggle member and is switched to the first position when the document table moves to the right and the second direction switching member comes into contact with the toggle member.

Furthermore, the movement control means may include a restraining member provided in a specified position of the document table, a lock member mounted to the main body of the apparatus and engageable with the restraining member, and an actuating mechanism for actuating the lock member. It may be appropriate that the actuating mechanism actuates the lock member to engage with the restraining member so as to lock the document table in the predetermined position when the drive means is stopped.

Also, the actuating mechanism may synchronizes with the drive means and include a lock driving device having an actuating member operably associated with the lock member. The actuating member may be brought to a first position when the drive means is stopped and to a second position when the drive means is started. It may be preferable that the actuating member causes the lock member to engage with the restraining member in the first position and causes the lock member to disengage from the restraining member in the second position.

Further, it may be desirable to provide first stopper means for stopping the document table in such a position where the restraining member and lock member engage with each other.

The stopper means may include a contact member pivotably mounted to the document table and a second stopper member mounted to the main body of the apparatus. The contact member may be operable in association with the actuating member, and may be in such a position as to come into contact with the second stopper member with movement of the document table when the actuating member is in the second position and to be away from the second stopper member regardless of movement of the document table when the actuating member is in the first position.

Moreover, the movement control means may include a contact member pivotably mounted in a specified position of the document table, second stopper means provided on the main body of the apparatus, and an actuating mechanism for actuating the contact member. It is appropriate that the contact member comes into contact with the third stopper member when the document table moves in one direction either to the left or right, whereby preventing the document table to move further in the one direction. Also, the contact member may be caused to pivot upward by the third stopper member upon coming into contact with the third stopper member whereby to move over the third stopper member when the document table moves in a direction opposite to the one direction. The actuating member may cause the contact member to move out of contact with the third stopper member when the drive means is started, thereby allowing the document table to move in the one direction.

In the image forming apparatus of the present invention, at least one of the operations of switching the moving direction of the document table and of locking the document table in the predetermined position is mechanically carried out. Accordingly, there is obviated the need for providing expensive electronic parts for switching the moving direction of the document table, stopping and locking the document table and thereby enabling the image forming apparatus provided with the movable document table to be manufactured at low costs.

Also, the movement control means includes the switch means for mechanically switching the moving direction of the document table. Accordingly, the moving direction can be reliably switched.

Further, the clutch mechanism and the toggle mechanism operable in association with the clutch mechanism are used for switching the moving direction of the document table. Accordingly, the image forming apparatus is allowed to have a simple construction and to reliably switch the moving direction of the document table.

Moreover, since the toggle mechanism is actuated by the first and second direction switching members mounted to the document table, the position of the toggle mechanism is switched according to movement of the document table.

Furthermore, since the document table is designed to be locked reliably in the predetermined position, there is no such likelihood that the document table moves unexpectedly whereby breaking the apparatus or hurting the operator even in the case where the apparatus is inclined.

Also, the document table is designed to be automatically locked when the drive means is stopped. Accordingly, the document table can be locked with ease.

Further, provision of the stopper means enables the document table to be stopped in the predetermined position reliably.

These and other objects, features and advantages of the present invention will become more apparent upon a reading of the following detailed description and accompanying drawings.

BRIEF DESCRIPTION OF THE DRAWINGS

FIG. 2 is a perspective view showing a document platen of the image forming apparatus in its mounted state;

FIGS. 10A to 10G are diagrams showing relationship between the stop/lock means and movement of the document table;

DETAILED DESCRIPTION OF PREFERRED EMBODIMENTS OF THE INVENTION

Figure 1:
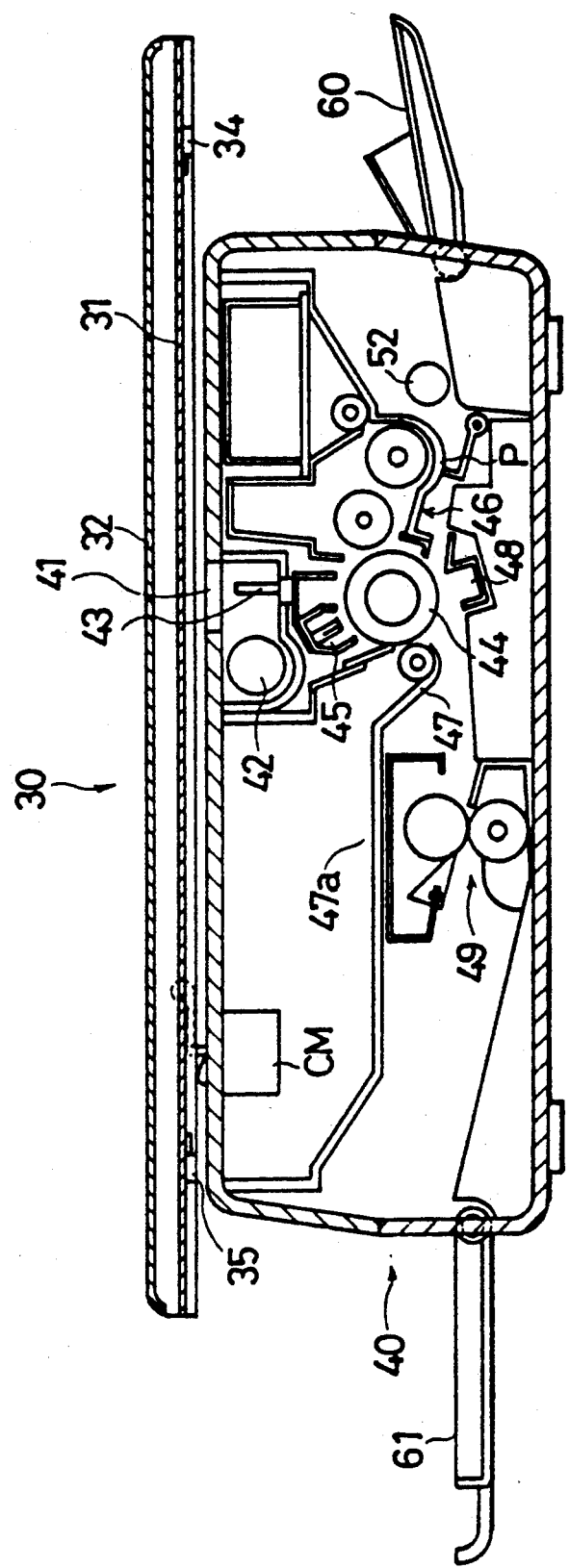
FIG. 1 is a front view in section showing an entire construction of an image forming apparatus provided with a movable document table embodying the invention.

FIG. 1 is a front view in section showing an entire construction of an image forming apparatus embodying the invention. It will be understood that terms "left" and "right" used hereafter in the specification are referred to sides of the image forming apparatus viewed from the front respectively. The image forming apparatus has a document table 30 and a main body 40. The document table 30 is provided with a document platen 31 made of transparent resin on which a document is placed and a document holder 32 for shielding the document from external light. The document table 30 moves reciprocatingly along a document exposing direction to the right and left sides above the apparatus main body 40. An image forming assembly including an exposing unit, photosensitive drum, and devices arranged around the drum is provided in the interior of the apparatus main body 40 to be described later.

Figure 4:
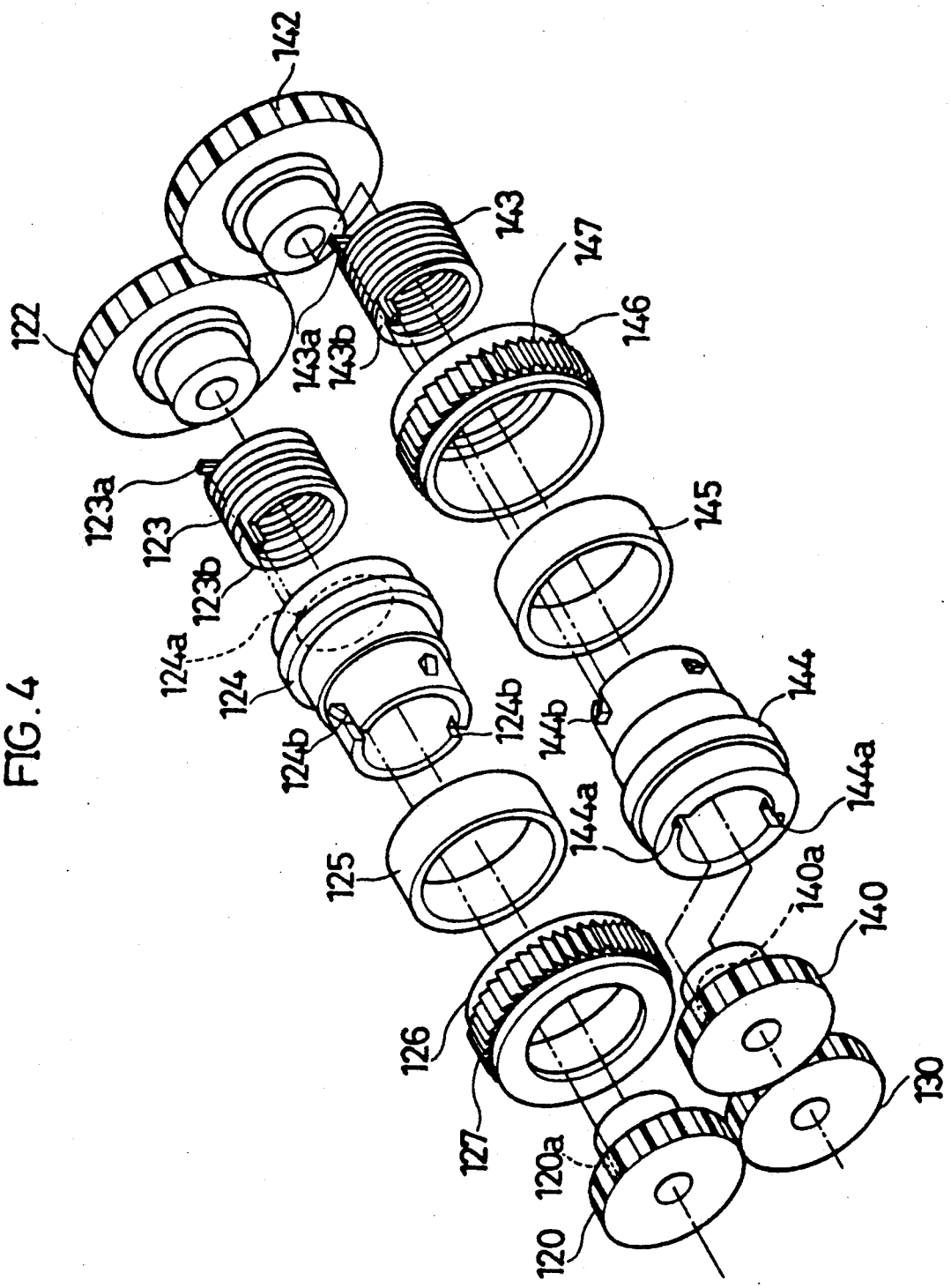
FIG. 4 is an exploded perspective view showing constructions of clutches used in the drive conversion mechanism.
Figure 5:
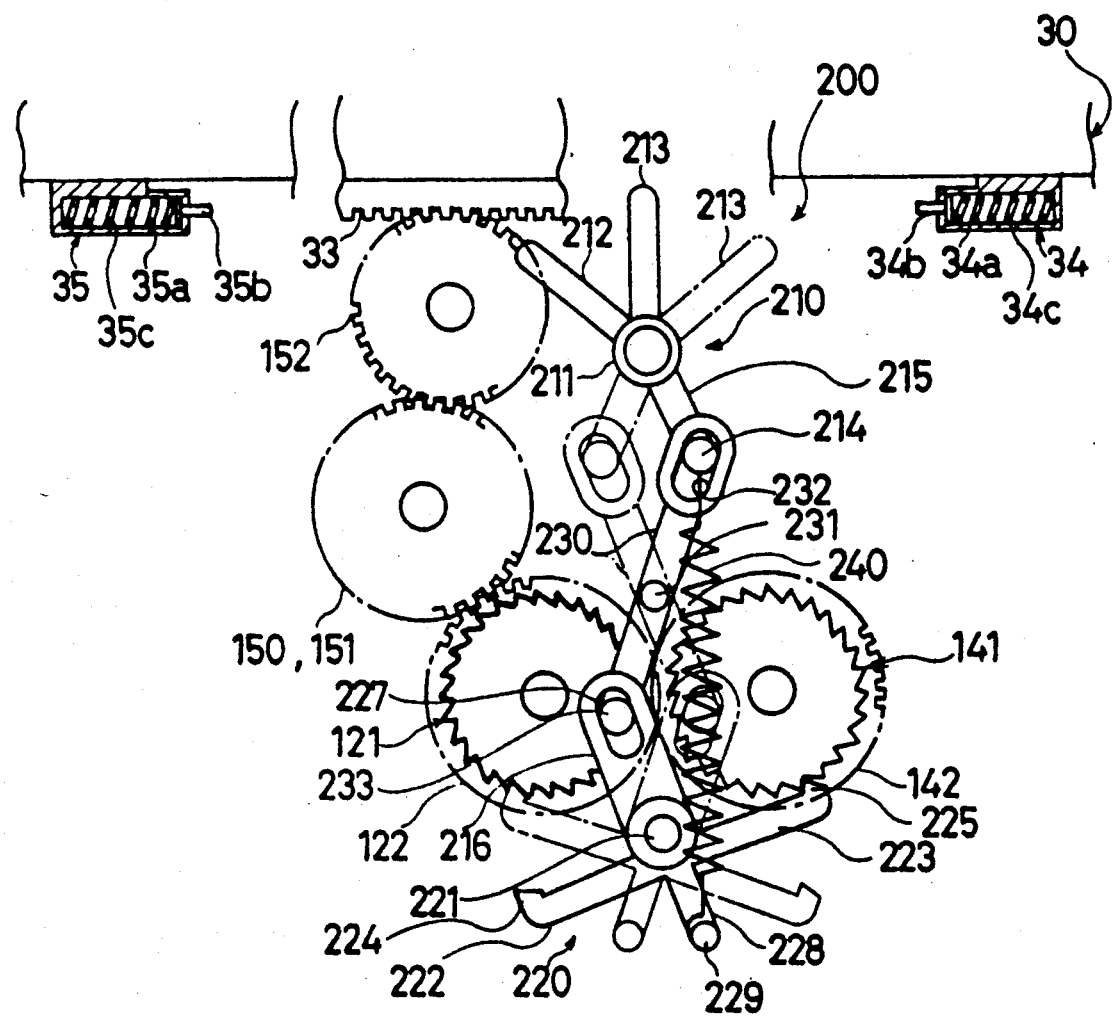
FIG. 5 is a front view schematically showing a toggle mechanism used in the drive conversion mechanism.

The document platen 31 is mounted to a mounting member 36 provided at a rear side of the document table 30. The mounting member 36 is in the form of a strip extending in the document exposing direction, and has a rack 33 extending in the same direction mounted to an underside thereof. Direction switching members 34, 35 are mounted to the lower face of the mounting member 36 at right and left side end portions with the member 34 disposed more forward than the member 35 as shown in FIG. 5. The members 34, 35 respectively include cylinders 34a, 35a, contact members 34b, 35b, and compression springs 34c, 35c. Each of the contact members 34b, 35b has a portion projecting inward of the table 30 with respect to the document exposing direction, and connected to its corresponding compression spring. The contact members 34b, 35b and springs 34c, 35c are accommodated in the cylinders 34a, 35a with the springs 34c, 35c biasing the members 34b, 35b inward of the table 30. The direction switching members 34, 35 and rack 33 will be described more in detail later with reference to FIGS. 3A to 5.

The apparatus main body 40 consists of an upper body section and a lower body section, which are separably attached to each other. An exposure slit 41 extending vertically to the drawing of FIG. 1 for exposing a document is defined at a center of an upper surface of the upper body section of the main body 1. Besides, the followings are provided in the upper body section. An exposure unit including a light source 42 such as a fluorescent lamp, condenser lens 43, etc. is provided below the slit 41. Below the exposure unit is disposed a photosensitive drum 44, and a main charger 45, developing device 46, and cleaning device 47 are arranged around the drum 44 in this order from a most upstream side. In the lower body section, there are provided a feed roller 52, transfer/separating device 48, fixing device 49, sheet insertion guide 60, and discharge tray 61 to which the copy sheet having a document image copied thereon is discharged. The sheet insertion guide 60 and discharge tray 61 are provided at right and left side surfaces of the lower body section. The fixing device 49 is disposed downstream of the drum 44, and above the fixing device 49 is formed a recirculated toner container 47a for containing therein toner recirculated by the cleaning device 47.

In an upper left side end portion of the upper body section are provided drive means for moving the document table 30 reciprocatingly along the document exposing direction and a movement control means CM having stop/lock means. Detailed description on these means will be given later.

A copying operation of thus constructed image forming apparatus is as follows. After a document is placed in a specified position on the document platen 31, a copy sheet is inserted along the sheet insertion guide 60 until a leading end thereof reaches the feed roller 52. Then, it is detected that the copy sheet is set by an unillustrated copy sheet sensor which in turn sends a corresponding sensor signal. Upon receipt of this sensor signal, a controller to be described later starts the copying operation.

The copy sheet is transported by the feed roller 52 up to a specified position (point P) along a sheet transport path, and waits in stand-by there. While the copy sheet is transported to the point P, the document table initially placed in a home position (state shown in FIG. 1) substantially at a center moves to the left. Upon a right side end of the table 30 reaching a position above the exposure unit, a moving direction thereof is reversed to the right, whereupon exposure of the document is started. The light source 42 is turned on in synchronism with the start of movement of the table 30, and reaches a certain level where it can emit sufficient light to expose the document by the time when the exposure of the document is started. The light emitted through the exposure slit 41 is reflected by a document surface, and the reflected light is projected onto the photosensitive drum 44 by way of the condenser lens 43. The surface of the drum 44 is charged by the main charger 45 so as to attain a specified potential while being rotated. At an exposure position, the reflected light is projected to the charged surface of the drum 44, whereby an electrostatic latent image of the document is formed thereon. This electrostatic latent image is developed with toner into a toner image by the developing device 46.

Transport of the copy sheet waiting in stand-by at point P is started at a specified timing while the electrostatic latent image is developed by the developing unit 46. The copy sheet has the developed document image transferred thereto and is separated from the surface of the drum 44 by the transfer/separating device 48. The copy sheet is discharged to the discharge tray 61 after the transferred document image is fixed to the copy sheet by the fixing device 49. The toner residual on the surface of the drum 44 after the document image is transferred to the copy sheet is removed by the cleaning device 47.

Upon completion of the exposure operation while the document image is formed, the document table 30 has its moving direction reversed to the left and returns to the home position. A moving period required for the table 30 to returns to the home position following start of movement thereof is set in advance in a controller (hereinafter referred to as CPU) 500 for controlling an overall operation of the image forming apparatus.

Next, the drive means and switch means will be described with reference to FIGS. 3A, 3B, 3C, 4 and 5. The drive means includes a drive motor 50 and drive conversion mechanism 100 for converting torque of the drive motor 50 into reciprocation of the table 30 to the left and right. The switch means includes a toggle mechanism 200 for changing the moving direction of the table 30.

The drive motor 50 is provided with a gear 51, and normally rotates the gear 51 in a specified direction with a predetermined torque when power is supplied thereto. The power supplied to the drive motor 50 is controlled by the CPU 500.

Figure 3A:
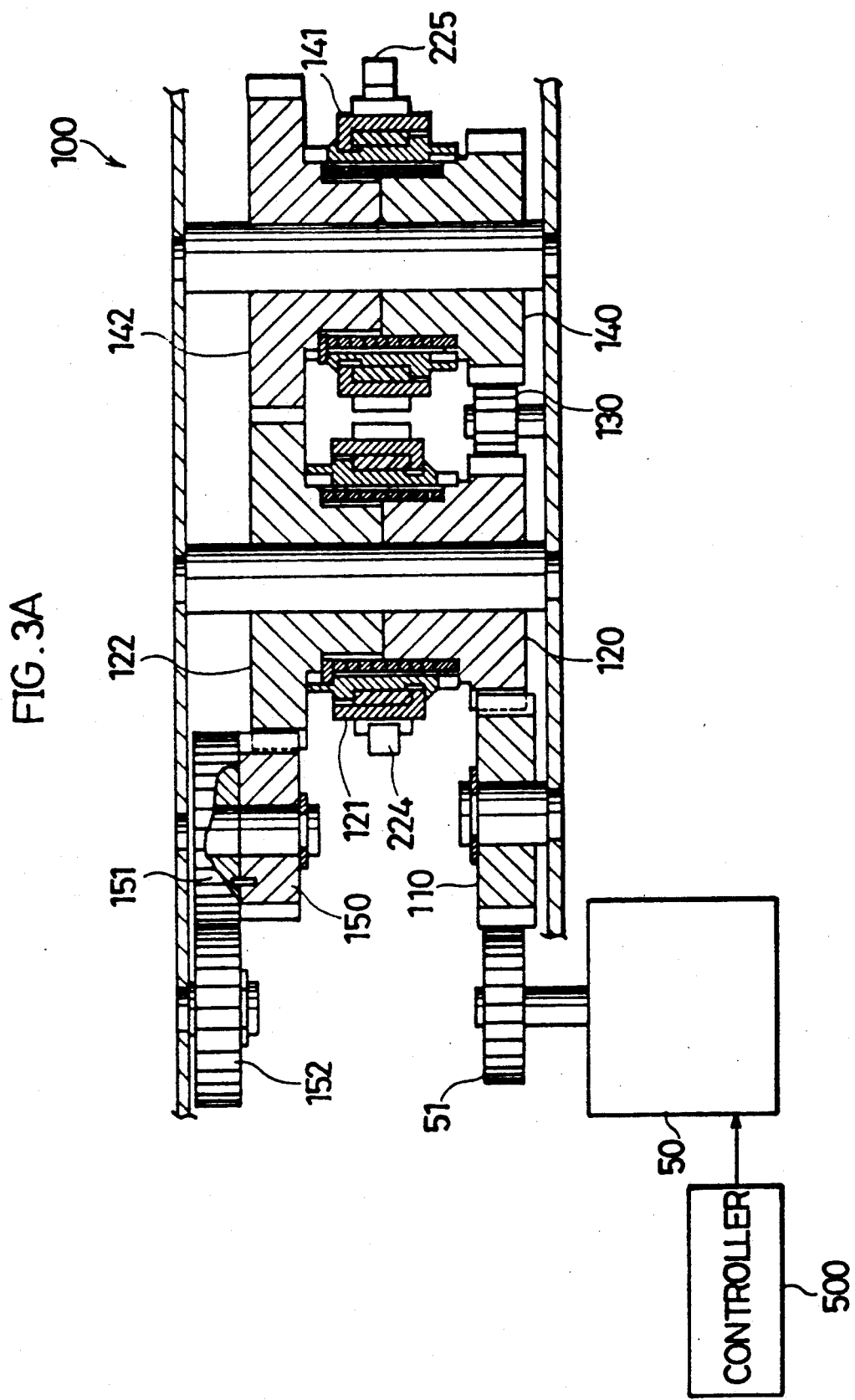
FIG. 3A is a horizontal sectional view showing a construction of a drive conversion mechanism of the image forming apparatus.

The drive conversion mechanism 100, as shown in FIG. 3A, includes a gear 110 in mesh with the gear 51 of the drive motor 50, left drive gear 120 in mesh with the gear 110, intermediate gear 130 in mesh with the left drive gear 120, right drive gear 140 in mesh with the intermediate gear 130, left driven gear 122, right driven gear 142, intermediate spur gear 150, intermediate gear 151, gear 152, and rack 33 which is mounted to the underside of the document table 30 and is in mesh with the gear 152. The left and right driven gears 122, 142 are driven together with the left and right drive gears 120, 140 by way of clutches 121, 141.

The clutches 121, 141 engages and disengages by way of the toggle mechanism 200, and are respectively brought into an operative state or an inoperative state by switching the toggle mechanism 200. The toggle mechanism 200 can cause only one of the clutches 121, 141 to engage at one time. When the clutch 121 is in the operative state, the torque of the left drive gear 120 is transmitted to the left driven gear 122. On the contrary, when the clutch 141 is in the operative state, the torque of the right drive gear 140 is transmitted to the right driven gear 142.

The torque of the drive motor 50 is transmitted to the right drive gear 140 by way of the gear 51, left drive gear 120 and intermediate gear 130. The torque of the left drive gear 120 is transmitted to the left driven gear 122 by bringing the corresponding clutch 121 into the operative state with the use of the toggle mechanism 200. Similarly, the torque of the right drive gear 140 is transmitted to the right driven gear 142 by bringing the corresponding clutch 141 into the operative state with the use of the toggle mechanism 200. The torque transmitted to the driven gear 122 or 142 is transmitted to the gear 152 by way of the intermediate gears 150, 151. The torque of the gear 152 is transmitted to the rack 33, whereby moving the document table 30 to the left or the right.

Figure 3B:
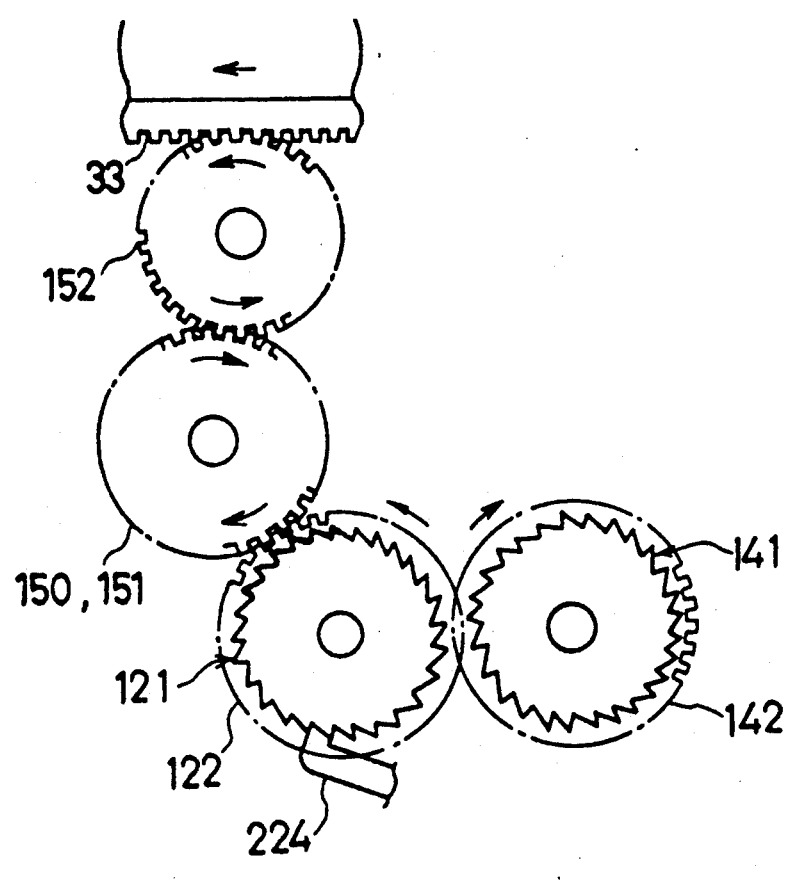
FIG. 3B is a schematic elevational view showing one transmission direction of the drive conversion mechanism.
Figure 3C:
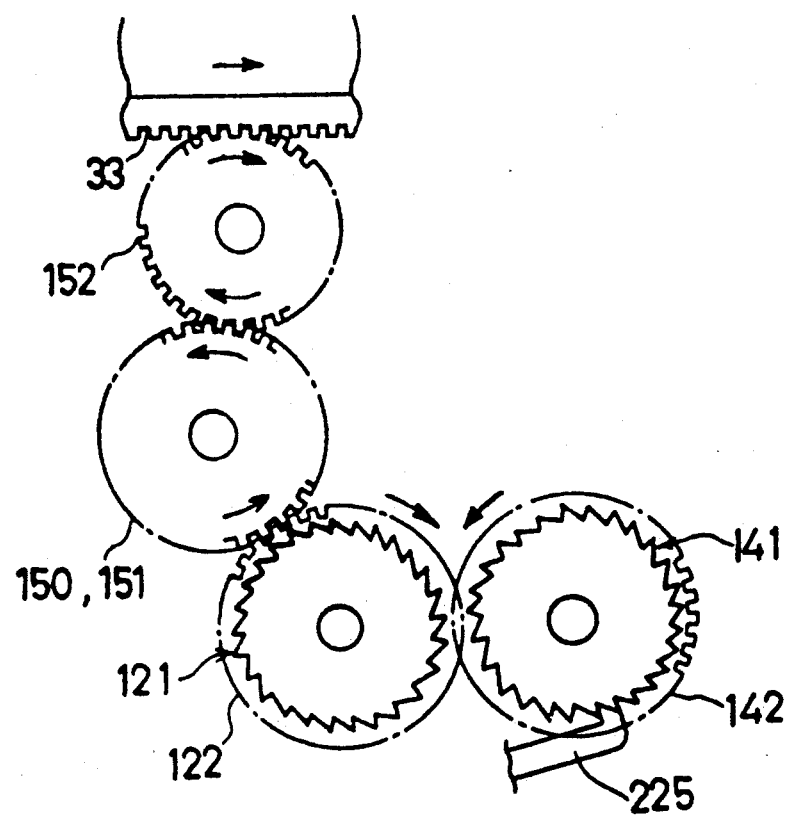
FIG. 3C is a schematic elevational view showing the other transmission direction of the drive conversion mechanism.

More specifically, the torque is transmitted in the drive conversion mechanism 100 as follows. The gear 51 is always rotated counterclockwise. Accordingly, the gear 110. 130 are always rotated clockwise, whereas the left drive gear 120 and right drive gear 140 are always rotated counterclockwise. Upon engagement of the clutch 121, the torque of the left drive gear 120 is transmitted to the left driven gear 122 as shown in FIG. 3B. The left driven gear 122 is rotated counterclockwise similarly to the left drive gear 120. The intermediate gears 150, 151 are rotated clockwise, and the gear 152 is rotated counterclockwise, whereby moving the document table 30 to the left. On the contrary, upon engagement of the clutch 141, the torque of the right drive gear 140 is transmitted to the right driven gear 142 as shown in FIG. 3C. The right driven gear 142 is rotated counterclockwise similarly to the right drive gear 140, rotating the left driven gear 122 in mesh therewith clockwise. The intermediate gears 150, 151 are rotated counterclockwise, and the gear 152 is rotated clockwise, whereby moving the document table 30 to the right. In other words, the toggle mechanism 200 is switched to engage either of the clutches 121, 141, whereby movement of the document table 30 to the left and right is controlled.

Next, there will be described construction of the clutches 121, 141. As shown in FIG. 4, the clutch 121 includes a rectangular-wire spring 123 made of wire having a square intersection, spring holding cylinder 124, friction cylinder 125 fitted to an outer circumferential surface of the cylinder 124, ratchet wheel 126 fitted to an outer circumferential surface of the cylinder 125. The ratchet wheel 126 has ratchet teeth 127 formed on a center portion of the outer circumferential surface thereof, and is engageable with the toggle mechanism 200. Opposite ends of the rectangular-wire spring 123 are bent, whereupon mounting portions 123a, 123b are formed. On the other hand, the spring holding cylinder 124 has at opposite ends thereof notches 124a, 124b formed for holding the spring 123. Further, a hole 120a for holding the spring 123 is formed in a proper position on an inner side face of the left drive gear 120. The spring 123 is contained in the cylinder 124 with the mounting portions 123a and 123b fitted to the notches 124a and the hole 120a respectively, whereby the left drive gear 120 and cylinder 124 are mechanically coupled to each other. The notches 124a have the same shape as notches 144a formed in a spring holding cylinder 144 provided in the clutch 141 to be described later. The torque of the left drive gear 120 is transmitted to the cylinder 124 in this way.

The ratchet wheel 126 and spring holding cylinder 124 are frictionally in contact with the friction cylinder 125 so as to rotate integrally when no external force is subjected thereto. When an external force is exerted onto the ratchet wheel 126 and cylinder 124, i.e., when the rotation of the ratchet wheel 126 is stopped by the toggle mechanism 200, the cylinder 124 is designed to rotate while sliding along an inner circumferential surface of the friction cylinder 125.

An inside diameter of the rectangular-wire spring 123 varies according to a relative speed of rotation of the left drive gear 120 with respect to that of the spring holding cylinder 124. In view of this, the inside diameter of the spring 123 is not to vary when the cylinder 124 idly rotates together with the left drive gear 120. However, when the external force is exerted onto the cylinder 124 and brakes the rotation of the cylinder 124, the rotating speed of the cylinder 124 becomes different from that of the gear 120. As a result, the inside diameter of the spring 123 becomes smaller.

When the clutch 121 is in the inoperative state, i.e., rotation of the ratchet wheel 126 is not interfered by the toggle mechanism 200, the cylinder 124 is allowed to idly rotate integrally with the ratchet wheel 126 and the spring 123 is not to be twisted in such a direction as to make the inside diameter thereof smaller. Accordingly, the torque of the left drive gear 120 is not to be transmitted to the left driven gear 122. On the other hand, when the rotation of the ratchet wheel 126 is stopped by the toggle mechanism 200, the cylinder 124 rotating upon receipt of the torque of the left drive gear 120 is braked. As a result, the rotating speed of the cylinder 124 is slowed and the spring 123 is twisted in the direction to make the inside diameter thereof smaller, thereby squeezing a boss of the left driven gear 122. In this way, the torque of the left drive gear 120 is transmitted to the left driven gear 122.

In the normal state where no external force is exerted, the inside diameter of the spring 123 is larger than an outside diameter of the boss of the left driven gear 122. In other words, the left driven gear 122 is allowed to idly rotate without bearing in contact with the spring 123. Accordingly, in a state where the torque of the drive motor 50 is allowed to be transmitted to the right driven gear 142, the torque transmitted to the left driven gear 122 is transmitted to the intermediate gear 150 with being subjected to almost no resistance by way of the left driven gear 122 rotating idly.

The clutch 141, constructed similarly to the clutch 121, includes a rectangular-wire spring 143, spring holding cylinder 144, friction cylinder 145, and ratchet wheel 146 having ratchet teeth 147 formed on a circumferential surface thereof. The spring holding cylinder 144 has at opposite ends thereof notches 144a, 144b formed for holding the spring 143. The ratchet wheel 146 is engageable with the toggle mechanism 200. Opposite ends of the rectangular-wire spring 143 are bent, whereupon mounting portions 143a, 143b are formed. Further, a hole 140a for holding the spring 143 is formed in a proper position on an inner side face of the right drive gear 140. The spring 143 is contained in the cylinder 144 with the mounting portions 143a and 143b fitted to the notch 144b and the hole 140a respectively, whereby the right drive gear 140 and cylinder 144 are mechanically coupled to each other. The notches 144b have the same shape as notches 124b formed in the spring holding cylinder 124. The torque of the right drive gear 140 is transmitted to the cylinder 144 in this way.

The rectangular-wire spring 143 works similarly to the rectangular-wire spring 123 of the clutch 121. Further, similarly to the clutch 121, the outside diameter of a boss of the right driven gear 142 is smaller than the inside diameter of the spring 143. In other words, the right driven gear 142 is allowed to idly rotate. Accordingly, in a state where the torque of the drive motor 50 is allowed to be transmitted to the left driven gear 122, the torque transmitted to the right driven gear 142 is transmitted to the intermediate gear 150 with being subjected to almost no resistance from the right driven gear 122 rotating idly.

As shown in FIG. 5, the toggle mechanism 200 includes a switch actuator 210, stopper 220, rotatable link 230 for coupling the actuator 210 with the stopper 220. The switch actuator 210 has a pivot 211 at a center thereof, and two contact portions 212, 213 extending upward from the pivot 211 with forming an angle therebetween. The contact portions 212, 213 are offset to each other in the direction vertical to the drawing of FIG. 5 (a forward and backward direction of the document table) so as to come into contact with the direction switching members 34, 35 provided at the right and left side ends of the underside of the document table 30 respectively. Extending downward from the pivot 211 is an arm 215 which has an engaging pin 214 mounted at a lower end thereof.

The rotatable link 230 has a pivot 231 at a center thereof and an oblong hole 232 formed at an upper end thereof. The hole 232 is engageable with the engaging pin 214 of the actuator 210. Further, at a lower end of the rotatable link 230 is mounted an engaging pin 233.

The stopper 220 is configured in the form of a cross and has a pivot 221 at a center thereof. At ends of the arms 222, 223 extending to the left and right from the pivot 221 are formed claws 224, 225 engageable with the ratchet teeth 127, 147 of the ratchet wheels 126, 146 of the clutches 121, 141 respectively. At an upper end of an arm 216 extending upward from the pivot 221 is formed a oblong hole 227 engageable with the engaging pin 233. At a lower end of an arm 228 extending downward from the pivot 221 is mounted a pin 229. A spring 240 is provided between the pin 229 and the engaging pin 214 of the switch actuator 210. The stopper 220 is always engageable with either of the clutches 121, 141 due to the elasticity of the spring 240.

Next, there will be described operations of the toggle mechanism 200. The document table 30 is in the home position in a normal state. The CPU 500 controls the table 30 to move to the left upon start of the driving of the drive motor 50 as mentioned above. When the table 30 is moving to the left, the toggle mechanism 200 is in a state indicated by a phantom line in FIG. 5. More specifically, the stopper 220 is engaged with the clutch 121 and the torque of the left drive gear 120 is transmitted to the left driven gear 122, whereby moving the table 30 to the left.

The document table 30 moves to the left up to a point where the direction switching member 34 comes into contact with the contact portion 212, whereby causing the contact portion 212 to pivot to the left against the elasticity of the spring 240. Thus, the toggle mechanism 200 is brought into a state indicated by a solid line in FIG. 5. Thereupon, the stopper 220 engages with the clutch 141, and the torque of the right drive gear 140 is transmitted to the right driven gear 142, whereby moving the document table 30 to the right. At this point, the exposure of the document is started.

When the document table 30 moves to the right up to a position where the exposure of the document is completed, the direction switching member 35 comes into contact with the contact portion 213, whereby causing the contact portion 213 to pivot to the right against the elasticity of the spring 240. Thus, the toggle mechanism 200 is brought into the state indicated by the phantom line in FIG. 5. Thereupon, the stopper 220 engages with the clutch 121, and the torque of the left drive gear 120 is transmitted to the left driven gear 122, whereby moving the document table 30 to the left.

The CPU 500 measures the moving period of the document table 30 following start of movement thereof. The CPU 500 stops the drive motor 50 after lapse of the moving period, so that the table 30 makes a complete stop at the home position. The toggle mechanism 200 is still operative at the time when the document table 30 returns to the home position. Accordingly, when a next copy sheet is set, whereby starting a next copying operation, the document table 30 moves to the left at first as mentioned above. Then, the table 30 moves to the right for exposure of a document.

In the above embodiment, the switch actuator 210 includes the contact portions 212, 213 offset to each other in the forward and backward direction. However, according to the invention, it is not particularly required to provide two contact portions. It is sufficient to provide a single contact portion in the switch actuator 210.

Figure 6:
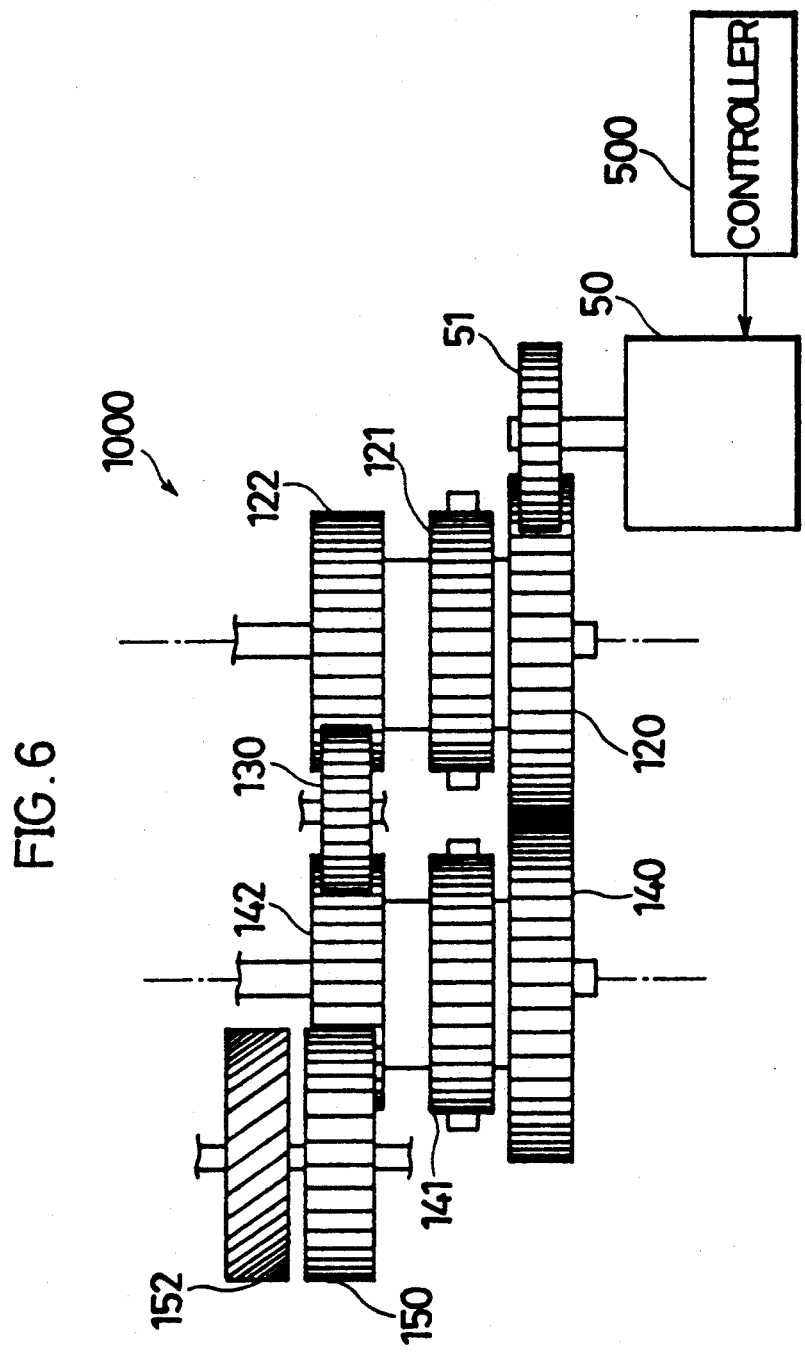
FIG. 6 is a plan view showing a construction of another drive conversion mechanism.

FIG. 6 is a diagram showing another drive conversion mechanism 1000 viewed from above. Unlike the drive conversion mechanism 100, an intermediate gear 130 is provided not between a left drive gear 120 and right drive gear 140, but between a left driven gear 122 and right driven gear 142 in the drive conversion mechanism 1000. Further, a drive motor 50 is disposed on the right side, and the intermediate gear 151 is omitted from the construction. Clutches 121, 141 are the same as those used in the drive conversion mechanism 100. The torque of the drive motor 50 is transmitted in the drive conversion mechanism 1000 as follows. A gear 51 is always rotated counterclockwise. Accordingly, the left drive gear 120 is always rotated clockwise while the right drive gear 140 is always rotated counterclockwise. When the clutch 121 engages, the left driven gear 122 is rotated clockwise similarly to the left drive gear 120; the intermediate gear 130 is rotated counterclockwise; the right driven gear 142 is rotated clockwise; the intermediate gear 150 is rotated counterclockwise; and a gear 152 is rotated counterclockwise. As a result, the document table 30 moves to the left. On the contrary, when the clutch 141 engages, the right driven gear 142 is rotated counterclockwise similarly to the right drive gear 140; the intermediate gear 150 in mesh with the gear 142, and the gear 152 are rotated clockwise. As a result, the document table 30 moves to the right.

Figure 7:
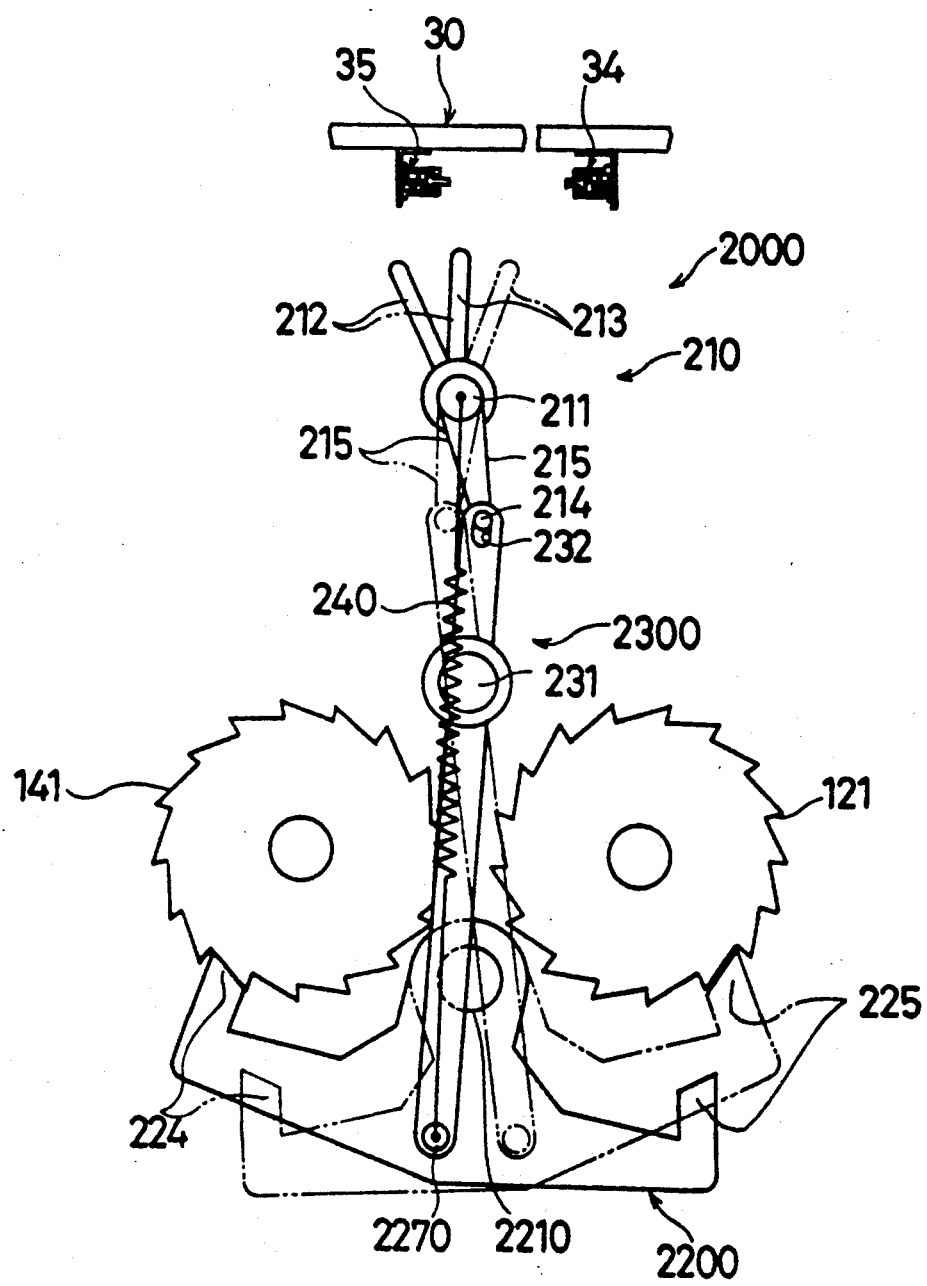
FIG. 7 is a front view schematically showing another toggle mechanism.

FIG. 7 is a diagram showing another toggle mechanism 2000 viewed from the front. The toggle mechanism 2000 is used with the drive conversion mechanism 1000, and has basically the same construction with the toggle mechanism 200 except that a stopper 2200 pivots to the right and left to engage with the clutches 121, 141 respectively. The stopper 2200 has a pivot 2210 and a shaft 2270 respectively at a top portion and bottom portion thereof. A lower end of a rotatable link 2300 is rotatably connected to the shaft 2270. When the document table 30 is in the normal state, the toggle mechanism 2000 is in a state indicated by a phantom line in FIG. 7, wherein the stopper 2200 is in engagement with the clutch 121. Thereby, the torque of the left drive gear 120 is transmitted to the left driven gear 122, whereby moving the document table 30 to the left. When the document table 30 moves to the left up to a point where the direction switching member 34 comes into contact with a contact portion 212, whereby causing the contact portion 212 to pivot to the right against the elasticity of a spring 240. This brings the toggle mechanism 2000 into a state indicated by a solid line in FIG. 7, and thereupon the stopper 2200 engages with the clutch 141 and the torque of the right drive gear 140 is transmitted to the right driven gear 142. As a result, the document table 30 moves to the right.

Figure 8:
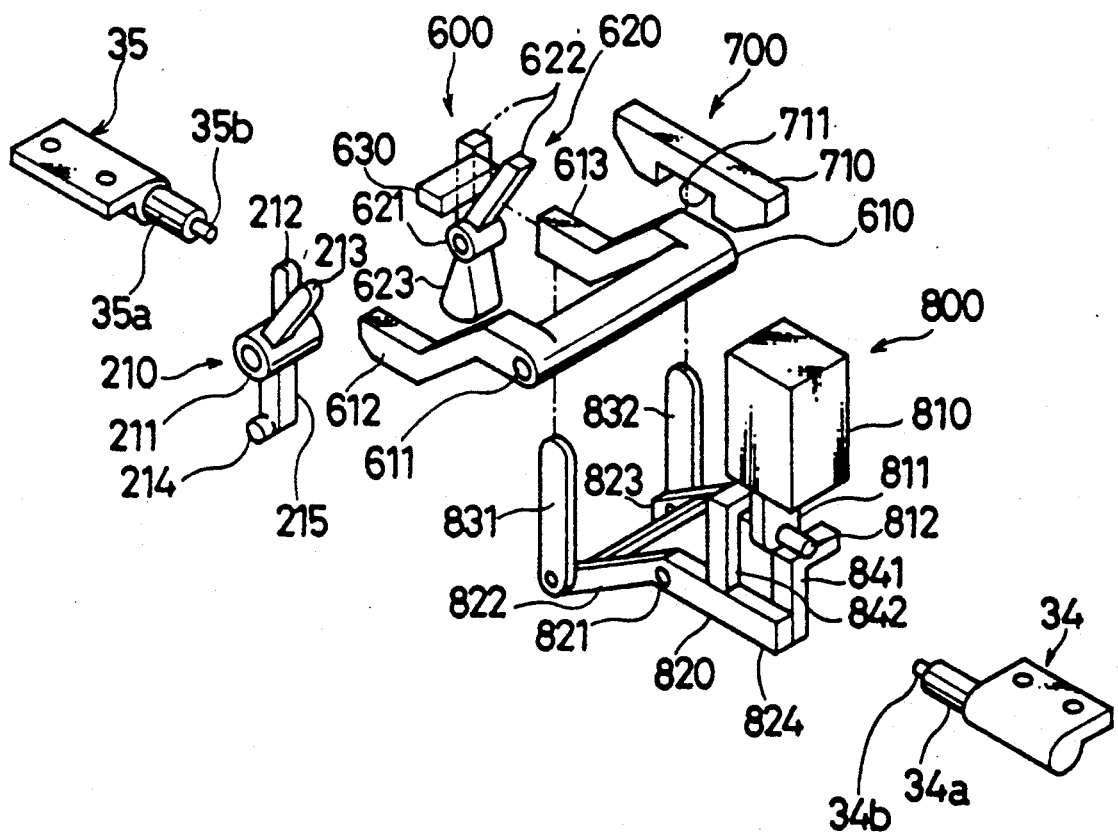
FIG. 8 is an exploded perspective view showing a construction of stop/lock means provided in the image forming apparatus.

Next, the stop/lock means provided in the movement control means CM will be described with reference to FIG. 8. The stop/lock means has a stop means 600, lock means 700, and actuator mechanism 800.

The actuator mechanism 800 includes an electromagnetic solenoid 810, pivotal frame 820, push-up members 831, 832 standing upright, arms 841, 842. The solenoid 810 constitutes a lock driving device, and the push-up member 831 constitutes a part of an actuating member, and the push-up member 832 constitutes a lock member. The electromagnetic solenoid 810 carries a plunger 811 having at a lower end thereof a pin 812 extending in the document exposing direction. The plunger 811 moves upward upon energization of the solenoid 810 and moves downward due to the weight thereof or the elasticity of an unillustrated spring upon deenergization of the solenoid 810. The solenoid 810 is energized at the same moment when the drive motor 50 is energized to move the document table 30. The pivotal frame 820 has a pivot 821 at a center thereof, two legs 822, 823 extending to the left from the pivot 821, and support member 824 extending to the right from the pivot 821 for supporting the arms 841, 842. Lower ends of the push-up members 831, 832 are connected to left side ends of the legs 822, 823, and are slidable in the vertical direction along appropriate guide members respectively. The arms 841, 842 have top portions thereof bent backward, and is so arranged as to hold the plunger 811 therebetween. Further, the bent portions of the arms 841, 842 are disposed at different levels so as to hold the pin 812 fast from below and from above respectively.

Upon energization of the electromagnetic solenoid 810, the plunger 811 moves upward and the pivotal frame 820 pivots counterclockwise, whereby the push-up members 831, 832 move downward. Upon deenergization of the solenoid 810, the plunger 811 moves downward and the pivotal frame 820 pivots clockwise, whereby the push-up members 831, 832 move upward. The actuator mechanism 800 is mounted to the apparatus main body.

The stop means 600 includes an actuating member 610, stopper 620, and block 630. The actuating member 610 has a pivot 611, front contact arm 612 extending to the left from a front end of the pivot 611, and a rear contact arm 613 extending to the left from a rear end of the pivot 611. The front contact arm 612 comes into contact with the contact portion 212 of the switch actuator 210. The push-up member 831 comes into contact with an underside of the rear contact arm 613 when the document table 30 moves to a predetermined position. In other words, the front contact arm 612 serves to change the position of the switch actuator 210. Thereupon, the actuating member 610 is caused to pivot clockwise as the push-up member 831 moves upward. The rear contact arm 613 further comes into contact with a contact portion 622 of the stopper 620. The actuating member 610 is mounted to the document table 30, and pivotable between a contact position where it is in contact with the stopper 620 and a pushed-up position where it is raised with elevation of the push-up member 831.

Figure 9A:
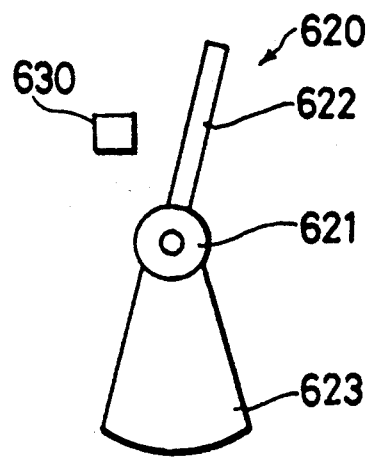
FIGS. 9A, 9B are diagrams showing operation states of a stopper used in the stop/lock means.
Figure 9B:
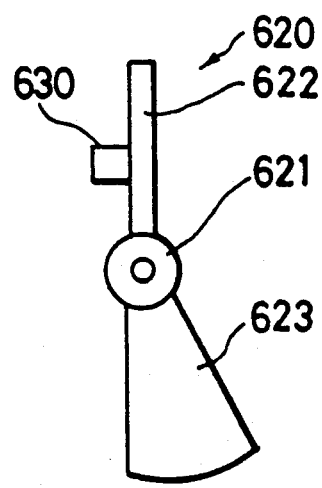

The stopper 620 is provided with a pivot 621, contact portion 622, and weight 623. To the left side of the stopper 620 is provided the block 630. The stopper 620 and block 630 are mounted to the apparatus main body. The stopper 620 is movable between an inclined position as shown in FIG. 9A and an upright position as shown in FIG. 9B. Normally, the stopper 620 is in the inclined position where the contact portion 622 is inclined to the right under the influence of the weight 630. In other words, the stopper 620 is maintained in a state indicated by a solid line in FIG. 8. When the rear contact arm 613 of the actuating member 610 comes into contact with the stopper 620, the contact portion 622 is caused to pivot to the left until it strikes the block 630 (upright position) as the document table 30 to which the actuating member 610 is mounted moves. In this case, the movement of the table 30 outweighs the influence of the weight 623. The block 630 prevents the contact portion 622 from further pivoting to the left, whereby stopping further movement of the actuating member 610 to the left. Consequently, the movement of the table 30 is stopped.

At the same time when the movement of the actuating member 610 is stopped by the stopper 620 and block 630, the front contact arm 612 thereof comes into contact with the contact portion 212 of the switch actuator 210. This causes the stopper 220 of the toggle mechanism 200 to pivot to a position slightly away from the clutch 121, whereby bringing the toggle mechanism 200 into the inoperative state.

The lock means 700 includes a restraining member 710 in the form of a block. A recessed portion 711 is formed at an underside of the restraining member 710, and is engageable with the push-up member 832. The recessed portion 711 is formed sufficiently larger than the width of the push-up member 832, so that the member 832 is allowed to move to the right and to the left therein. An oblong hole extending to the right and left may be formed in place of the recessed portion 711.

Next, operations of the stop/lock means will be described more in detail with reference to FIGS. 10A to 10G. As described above, the document table 30 moves to the left from the home position upon start of the copying operation. Then, the table 30 moves to the right for the exposure operation and has its moving direction reversed to the left upon completion of the exposure operation. Consequently, the table 30 moves to the left to return to the home position. FIGS. 10A to 10G are diagrams showing in detail states of the stop/lock means according to a series of movements of the document table 30. In each of these figures, a drawing at a top stage shows positional relationship between the restraining member 710 and push-up member 832; a drawing at a middle stage shows positional relationship between the stopper 620, rear contact arm 613 of the actuating member 610, and push-up member 831; and a drawing at a bottom state shows positional relationship between the switch actuator 210 and front contact arm 612 of the actuating member 610.

Figure 10B:
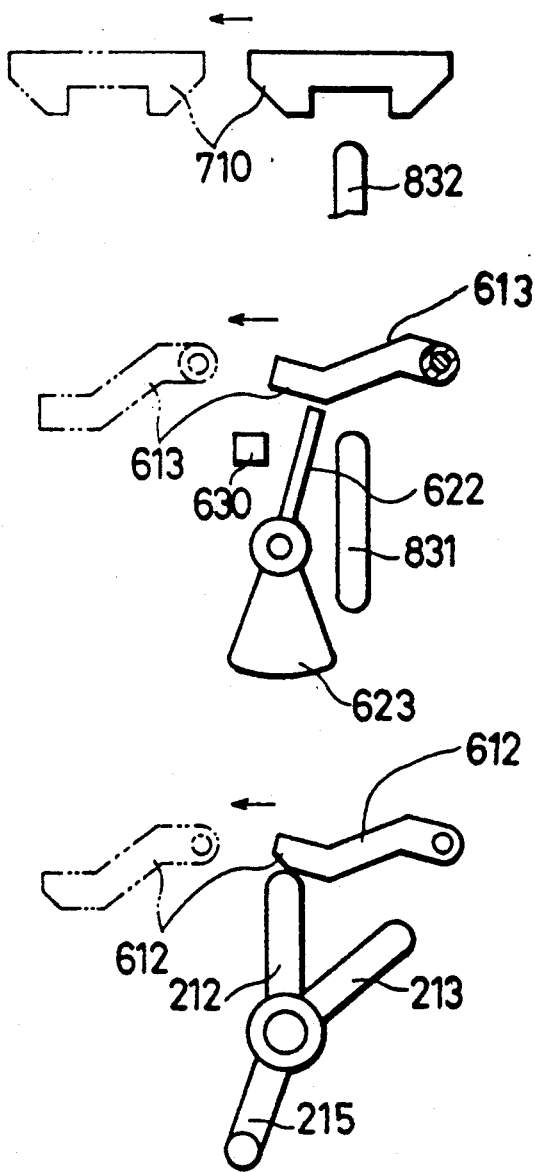

FIG. 10A shows a state of the stop/lock means when the document table 30 is locked in the home position. The push-up member 832 is pushed upward by the actuator mechanism 800 and engages with the recessed portion 711 formed in the restraining member 710, whereby to prevent the document table 30 from moving to the left or right. At the same time, the actuating member 610 is caused to pivot clockwise by the push-up member 831, with the result that the rear and front contact arms 613, 612 are located above the contact portion 622 of the stopper 620 and the contact portion 212 of the switch actuator 210 respectively. Upon start of the copying operation, the drive motor 50 and electromagnetic solenoid 810 are energized. Thereby, the plunger 811 of the solenoid 810 moves upward while causing the push-up members 831, 832 to move downward. As a result, the stop/lock means is brought into a state shown in FIG. 10B. More specifically, the push-up member 832 disengages from the recessed portion 711 of the restraining member 710, thereby releasing the locking state of the document table 30. The actuating member 610 pivots counterclockwise, and the rear contact member 613 rests on the upper end face of the contact portion 622 of the stopper 620 while the front contact member 612 rests on the upper end face of the contact portion 212 of the switch actuator 210. This allows the rear and front contact arms 613, 612 respectively to slide on the upper end faces of the contact portion 622 and contact portion 212, whereby enabling the document table 30 to move to the left freely.

FIG. 10C shows a state of the stop/lock means when the document table 30 moves to the left and reaches a point where the direction switching member 34 mounted to the table 30 at the right end portion thereof is in contact with the contact portion 212. Further movement of the document table 30 to the left makes the direction switching member 34 rotate the contact portion 212 of the switch actuator 210 to the left, whereby engaging the stopper 220 of the toggle mechanism 200 with the clutch 121 to switch the moving direction of the table 30 to the right. FIG. 10D shows a state of the stop/lock means when, while the table 30 is moving to the right, the rear and front contact arms 613, 612 strike the contact portion 622 and contact portion 213 to cause them to pivot clockwise, whereby moving to the right over the contact portion 622 and contact portion 213 respectively. FIG. 10E shows a state of the stop/lock means when the table 30 moves to the right and reaches a point where the direction switching member 35 mounted to the table 30 at the left end portion thereof is in contact with contact portion 213. Further movement of the document table 30 to the right makes the direction switching member 35 rotate the contact portion 213 of the switch actuator 210 to the right, whereby engaging the stopper 220 of the toggle mechanism 200 with the clutch 141 to switch the moving direction of the table 30 to the left. Following this, the table 30 starts moving to the left again.

FIG. 10F shows a state of the stop/lock means when the document table 30 moves to the left and reaches a point where the rear contact arm 613 comes into contact with the contact portion 622 of the stopper 620, whereby to cause the stopper 620 to strike the block 630. In other words, FIG. 10F shows a state of the stop/lock means when the table 30 is stopped upon engagement of the stopper 620 with block 630. In this state, the front contact arm 612 comes into contact with the contact portion 212 of the switch actuator 210, whereby to cause the contact portion 212 to pivot slightly to the left. This causes the stopper 220 of the toggle mechanism 200 to pivot to the position slightly away from the clutch 121, releasing the engaged state of the clutch 121.

It will be understood that an energization period of the drive motor 50 and the electromagnetic solenoid 810 is set in the CPU 500 in advance. The energization period is set slightly longer than a period required for the document table 30 to completely return to the home position following start of its movement therefrom. The reason for this is that it is difficult for the table 30 to make a complete stop at the home position even if the drive motor 50 is deenergized at the moment when the rear contact arm 613 of the actuating member 610 comes into contact with the stopper 620 to stop the movement of the table 30. This is because the document table in motion inevitably produces reaction force due to the inertia thereof when the rear contact member 613 comes into contact with the stopper 620, and the produced reaction force may act to cause the rear contact arm 613 to retract slightly to the right relative to the stopper 620. In order to prevent the retraction of the rear contact arm 613 due to the reaction force, the drive motor 50 is energized slightly further even after the movement of the document table 30 is stopped by the stopper 613. The contact member 613 retracted to the right is brought into contact with the stopper 620 again and stays there. The document table 30 can be reliably stopped at the home position in this way.

Also, the reason that the clutches 121, 141 are brought into the inoperative states is to drive the drive conversion mechanism 100 idly for a while after the copying operation is completed to put engagement of the gears in order, so that the drive conversion mechanism 100 starts smoothly when a next copying operation is executed.

Figure 10G:
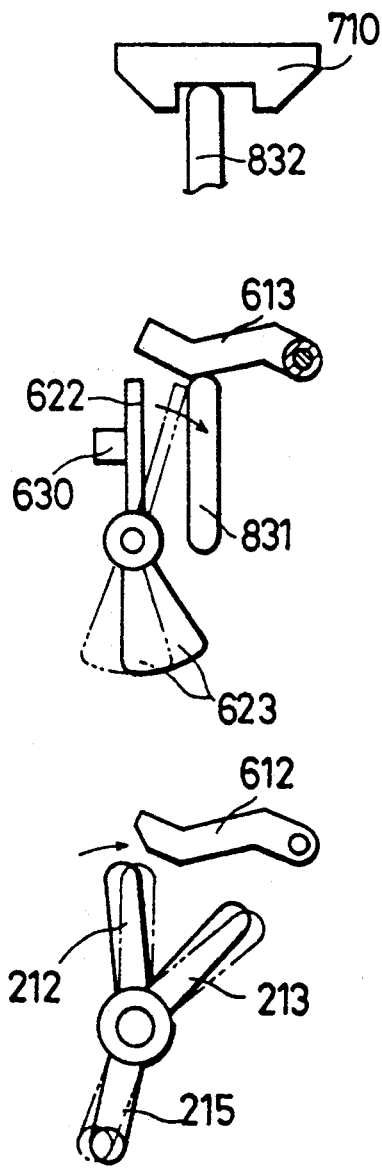

FIG. 10G shows a state of the stop/lock means when the push-up member 832 is pushed upward to engage with the recessed portion 710 of the restraining member 710 again, whereby to lock the document table 30 in the home position. More specifically, the drive motor 50 and electromagnetic solenoid 810 are deenergized and the plunger 811 of the solenoid 810 moves downward while causing the push-up members 831, 832 to move upward. The upward movement of the push-up member 831 causes the actuating member 610 to pivot clockwise, and thereby the rear contact arm 613 reaches a position above the upper end face of the contact portion 622 of the stopper 620. As a result, the stopper 620 pivots to the inclined position from the upright position due to the weight thereof. Further, the front contact arm 612 reaches a position above the upper end face of the contact portion 212 of the switch actuator 210 and the stopper 220 of the toggle mechanism 200 engages with the clutch 121 again to bring the clutch 121 into the operatively state. On the other hand, the push-up member 832 also moves upward and is engaged with the recessed portion 711 of the restraining member 710. Consequently, the stop/lock means is brought into the state shown in FIG. 10A.

In the above embodiment, the moving period of the document table 30 set in the CPU 500 is slightly longer than a period required for the table 30 to return to the home position following start of its movement therefrom. However, according to the invention, it may not be necessary to provide such overtime in excess of the required moving period. For example, the stopper 620 may be provided with a sensor for detecting that the rear contact arm 613 is in contact therewith. Upon detecting that the rear contact arm 613 is in contact with the stopper 620, the sensor sends a contact signal to the CPU 500, which in turn stops the driving of the drive motor 50 in accordance with the contact signal.

Figure 11:
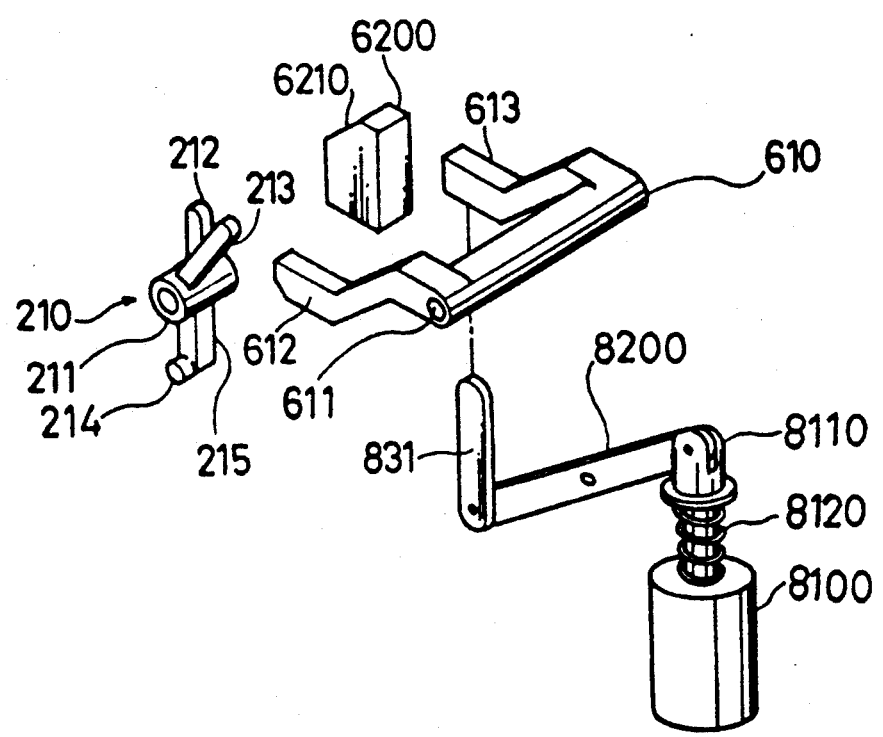
FIG. 11 is an exploded perspective view showing another stop/lock means.

FIG. 11 shows a second stop/lock means in accordance with the invention. This stop/lock means is adapted not for preventing the movement of the document table 30 to the left and right while the copying operation is not executed, but for preventing the movement of the table 30 to the left while the copying operation is not executed. This stop/lock means is constructed identically to the former stop/lock means shown in FIG. 8 except that it is not provided with a restraining member 710 having a recessed portion 711, and push-up member 832 engageable with the recessed portion 711; and a stopper is formed of a single member.

A stopper 6200 provided in the second stop/lock means is made of a single block as shown in FIG. 11 and has a slanting face 6210 at a left upper portion. The slanting face 6210 is formed to facilitate movement of the rear contact arm 613 over the stopper 6200 when the document table 30 moves to the right. The stopper 6200 is placed in such a position as to be in contact with the rear contact arm 613 when the table 30 moves to the home position.

The actuating mechanism includes an electromagnetic solenoid 8100 having a plunger 8110 movable in a vertical direction, push-up member 831, pivotal member 8200 for transmitting movement of the plunger 8110 to the push-up member 831, and spring 8120 for biasing the plunger 8110 upward.

Upon energization of the electromagnetic solenoid 8100, the plunger 8110 moves downward against the elasticity of the spring 8120 and causes the push-up member 813 to move upward. The push-up member 813 in turn pushes the rear contact arm 613 above the stopper 6200. Upon deenergization of the solenoid 8100, the plunger 8110 is moves upward by the elasticity of the spring 8120 causing the push-up member 813 to move downward. Accordingly, the rear contact arm 613 pivots counterclockwise and comes into contact with the stopper 6200.

Next, operations of the second stop/lock means will be described with reference to FIGS. 12A to 12C. In each of these figures, a drawing at an upper stage shows positional relationship between the stopper 6200, rear contact arm 613 of the actuating member 610, and push-up member 831; and a drawing at a lower stage shows positional relationship between the switch actuator 210 and front contact arm 612 of the actuating member 610.

Figure 12A:
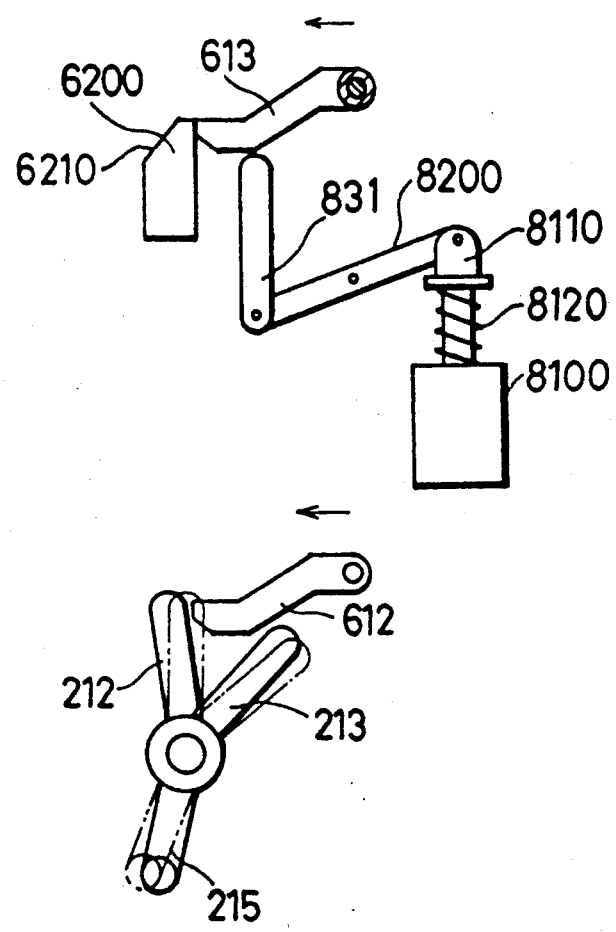
FIGS. 12A to 12C are diagrams showing relationship between another stop/lock means and movement of the document table.

Before the copying operation is started, as shown in FIG. 12A, the rear contact arm 613 is in contact with the stopper 6200, whereby preventing the document table 30 from moving to the left.

Figure 12B:
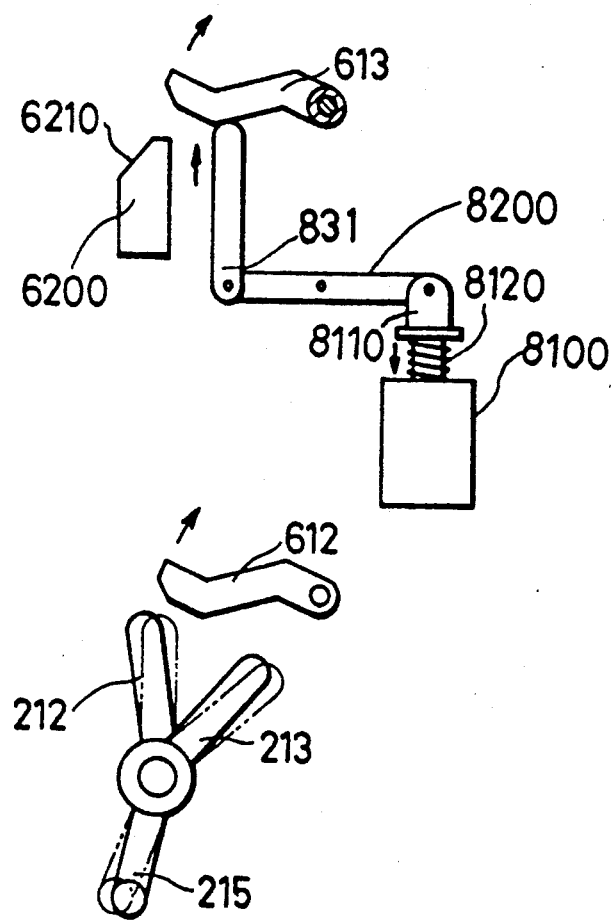

When the copying operation is started, as shown in FIG. 12B, the drive motor 50 and electromagnetic solenoid 8100 are energized. Then, the plunger 8110 of the solenoid 8100 moves downward, causing the push-up member 831 to move upward. The rear contact arm 613 is pushed upward by the member 831 to pivot clockwise. Thereafter, when the document table 30 starts moving to the left, the rear contact arm 613 moves to the left sliding over upper faces of the push-up member 831 and stopper 6200. Then, similarly to the state shown in FIG. 10C, the direction switching member 34 causes the contact portion 212 of the switch actuator 210 to pivot to the left, and the stopper 220 of the toggle mechanism 200 engages with the clutch 121. Consequently, the document table 30 has its moving direction reversed and starts moving to the right.

Figure 12C:
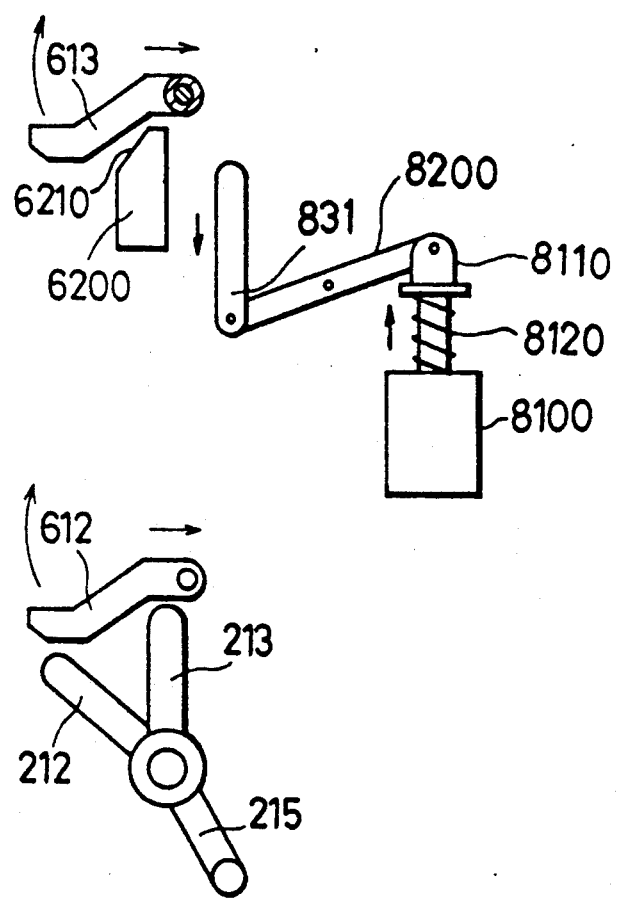

FIG. 12C, corresponding to FIG. 10D, shows a state of the second stop/lock means when, while the document table 30 is moving to the right, the rear and front contact arms 613, 612 move to the right over the stopper 6200 and the contact portion 212 by pivoting clockwise upon striking the slanting face 6210 of the stopper 6200 and contact portion 213 respectively.

The solenoid 8100 is deenergized after lapse of a predetermined period following start of energization, whereupon the plunger 8100 is moved upward by the elasticity of the spring 8120 causing the push-up member 831 to move downward. Thereafter, similarly to the state shown in FIG. 10E, the direction switching member 35 provided at the left end of the table 30 comes into contact with the contact portion 213 of the switch actuator 210. Thereby, the contact portion 213 pivots to the right, and the stopper 220 of the toggle mechanism 200 engages with the clutch 121. Consequently, the document table 30 has its moving direction reversed and starts moving to the left again.

Thereafter, the document table 30 moves to the left and the state of the second stop/lock means returns to the one shown in FIG. 12A wherein the rear contact arm 613 is in contact with the stopper 6200. In this state, the movement of the document table 30 is stopped by the stopper 6200. The front contact arm 612 comes into contact with the contact portion 212 of the switch actuator 210, whereby causing the contact portion 212 to pivot slightly to the left. The stopper 220 of the toggle mechanism 200 is caused to pivot to a position slightly away from the clutch 121 so that the clutch 121 is released from the engaged state thereof. The image forming apparatus waits for a next copying operation with the second stop/lock means in this state.

The second stop/lock means is unable to prevent the document table 30 from moving to the right while the copying operation is not executed. However, it can certainly contribute to a further simplified construction of the image forming apparatus.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image forming apparatus comprising:
    a main body having an image forming means;
    a document table for holding the document, the table being movable reciprocatingly to the left and right sides of the apparatus when viewed from front over an upper surface of the main body;
    drive means for moving the document table, the drive means including a drive motor rotatable in a specified direction and a conversion mechanism for converting the torque of the drive motor into the driving force for moving the document table to the left or right side;
    movement control means for mechanically executing at least one operation of:
        a) switching a moving direction of the document table; and
        b) locking the document table in a predetermined position;
    the movement control means including switch means for causing the conversion mechanism to convert the torque of the drive motor into movement of the document table to the left from that of the document table to the right when the document table moves to the left up to a first predetermined position, and to convert the torque of the driving motor into movement of the document table to the right from that of the document table to the left when the document table moves to the right up to a second predetermined position;
    the conversion mechanism including a drive portion operable in association with the drive motor, and a left movement drive portion and a right movement drive portion operable in association with the drive portion; and
    the switch means includes:
        a clutch mechanism provided between the drive portion and left movement drive portion and between the drive portion and right movement drive portion for coupling the drive portion with either the left or right movement drive portion;
        a toggle mechanism operable in association with the clutch mechanism, the toggle mechanism having a first position and a second position; and
        a switch member for switching the position of the toggle mechanism;
    the clutch mechanism coupling the drive portion with the left movement drive portion when the toggle mechanism is switched to the first position by the switch member, and coupling the drive portion with the right movement drive portion when the toggle mechanism is switched to the second position by the switch member.

2. An image forming apparatus as defined in claim 1 wherein the toggle mechanism further has a third position where the drive portion is not coupled with neither the left movement drive portion nor right movement drive portion.

3. An image forming apparatus as defined in claim 1 wherein the switch member has a first direction switching member provided at a right end of the document table and a second direction switching member provided at a left end of the document table, and the toggle mechanism is switched to the second position when the document table moves to the left and the first direction switching member comes into contact with the toggle member and is switched to the first position when the document table moves to the right and the second direction switching member comes into contact with the toggle member.

4. An image forming apparatus as defined in claim 1 wherein:
    the conversion mechanism has a rotary member for driving the document table;
    the left and right movement drive portions have driven gears respectively, the driven gear including a boss having a specified outside diameter, either one of the driven gears of the left and right movement drive portions engaged with the rotary member;
    the clutch mechanism has a left clutch element provided between the drive portion and left movement drive portion and a right clutch element provided between the drive portion and right movement drive portion, each of the left and right clutch elements including a spring holding cylinder, a helical spring for coupling the drive portion with the spring holding cylinder, a friction cylinder provided on an outer circumferential surface of the spring holding cylinder, and a ratchet wheel provided on an outer circumferential surface of the friction cylinder, a portion of the helical spring being positioned on an outer circumferential surface of the boss of the driven gear, the ratchet wheel operable in association with the toggle mechanism, the spring holding cylinder, helical spring, friction cylinder and ratchet wheel being rotatable together with one another by the torque of the drive portion, when the toggle mechanism is engaged with the ratchet wheel to stop rotation of the ratchet wheel, the friction cylinder braking rotation of the spring holding cylinder, and an inside diameter of the helical spring becoming smaller, whereby the portion of the helical spring squeezing the boss to transmit the torque of the drive portion to the driven gear.

5. An image forming apparatus as defined in claim 4 wherein the inside diameter of the helical spring is greater than the outside diameter of the boss while the toggle mechanism is not engaged with the ratchet wheel to allow the ratchet wheel to idly rotate.

6. An image forming apparatus as defined in claim 4 further comprising a first shaft and a second shaft disposed in parallel to each other wherein:
the drive portion includes a left drive gear rotatable to drive the document table to the left and a right drive gear rotatable to drive the document table to the right;
the left drive gear, left clutch element, and driven gear of the left movement drive portion are mounted to the first shaft with the left clutch element provided between the left drive gear and the driven gear of the left movement drive portion; and
the right drive gear, right clutch element, and driven gear of the right movement drive portion are mounted to the second shaft with the second clutch element provided between the second drive gear and the driven gear of the right movement drive portion.

7. An image forming apparatus as defined in claim 6 further comprising an intermediate gear provided between the left drive gear and the right drive gear.

8. An image forming apparatus as defined in claim 6 further comprising an intermediate gear provided between the driven gears of the left and right movement drive portions.

9. An image forming apparatus as defined in claim 1 wherein the toggle mechanism includes a switch actuator pivotable to the left and right upon coming into contact with the switch member, a first stopper member swingable to the left and right about a center thereof, and a rotatable link for connecting the switch actuator with the first stopper member to transmit pivotal movement of the switch actuator to the stopper member, whereby to cause the stopper member to swing, and the clutch mechanism includes a left clutch element for coupling the drive portion with the left movement drive portion, and a right clutch element for coupling the drive portion with the right movement drive portion, the first stopper member being engaged with the left clutch element when the switch member causes the switch actuator to pivot to the right and the first stopper member being engaged with the right clutch element when the switch member causes the switch actuator to pivot to the left.

10. An image forming apparatus comprising:
a main body having an image forming means;
a document table for holding the document, the table being movable reciprocatingly to the left and right sides of the apparatus when viewed from front over an upper surface of the main body;
drive means for moving the document table;
movement control means for mechanically executing at least one operation of:
a) switching a moving direction of the document table; and
b) locking the document table in a predetermined position;
the movement control means including:
a restraining member provided in a specified position of the document table;
a lock member mounted to the main body of the apparatus and engageable with the restraining member; and
an actuating mechanism for actuating the lock member, the actuating mechanism actuating the lock member to engage with the restraining member so as to lock the document table in the predetermined position when the drive means is stopped;
the actuating mechanism synchronizing with the drive means and including a lock driving device having an actuating member operably associated with the lock member; and
the actuating member being brought to a first position when the drive means is stopped and to a second position when the drive means is started, the actuating member causing the lock member to engage with the restraining member in the first position and causing the lock member to disengage from the restraining member in the second position;
first stopper means for stopping the document table in such a position where the restraining member and lock member engage with each other;
the first stopper means including a contact member pivotably mounted to the document table and a second stopper member mounted to the main body of the apparatus; and
the contact member being operable in association with the actuating member through the lock member, and being in such a position as to come into contact with the second stopper member with movement of the document table when the actuating member is in the second position and to be away from the second stopper member regardless of movement of the document table when the actuating member is in the first position.

11. An image forming apparatus as defined in claim 10 wherein:
the drive means includes a drive motor rotatable in a specified direction and conversion mechanism for converting the torque of the drive motor into the driving force for moving the document table to the left or right side;
the movement control means includes switch means for causing the conversion mechanism to convert the torque of the drive motor into movement of the document table to the left from that of the document table to the right when the document table moves to the left up to a first predetermined position, and to convert the torque of the driving motor into movement of the document table to the right from that of the document table to the left when the document table moves to the right up to a second predetermined position;
the switch means includes a clutch mechanism provided between the drive portion and left movement drive portion and between the drive portion and right movement drive portion for coupling the drive portion with either the left or right movement drive portion, a toggle mechanism operable in association with the clutch mechanism, the toggle mechanism including a switch actuator having a first position, a second position, and a third position, and a switch member for switching the position of the switch actuator of the toggle mechanism, the contact member having a position changing portion for changing the position of the switch actuator, the clutch mechanism coupling the drive portion with the left movement drive portion when the switch actuator is switched to the first position by the switch member, coupling the drive portion with the right movement drive portion when the switch actuator is switched to the second position by the switch member, and coupling the drive portion with neither the left movement drive portion nor right movement drive portion when the switch actuator is switched to the third position by the changing portion of the contact member, the changing portion coming into contact with the switch actuator when the contact member comes into contact with the second stopper member.

12. An image forming apparatus comprising:
a main body having an image forming means;
a document table for holding the document, the table being movable reciprocatingly to the left and right sides of the apparatus when viewed from front over an upper surface of the main body;
drive means for moving the document table;
movement control means for mechanically executing at least one operation of:
 a) switching a moving direction of the document table; and
 b) locking the document table in a predetermined position;
the movement control means including a contact member pivotably mounted in a specified position of the document table, a second stopper means provided on the main body of the apparatus, and an actuating mechanism for actuating the contact member;
the contact member coming into contact with the second stopper means when the document table moves in one direction either to the left or right, thereby preventing the document table from moving further in the one direction, and is caused to pivot upwardly by the second stopper means upon coming into contact with the second stopper means thereby to move over the second stopper means when the document table moves in a direction opposite to the one direction; and
the actuating member causing the contact member to move out of contact with the second stopper means when the drive means is started, thereby allowing the document table to move in the one direction.

13. An image forming apparatus as defined in claim 12 wherein the actuating mechanism is mounted to the main body of the apparatus.

14. An image forming apparatus as defined in claim 13 wherein the movement control means further includes restraining means for preventing the document table from moving in the opposite direction, the restraining member having a restraining member mounted in a specified position of the document table and a lock member mounted to the main body of the apparatus and engageable with the restraining member, the lock member being driven by the actuating mechanism.

15. An image forming apparatus as defined in claim 14 wherein the lock member is driven so as to engage with the restraining member when the drive means is stopped.

16. An image forming apparatus as defined in claim 13 wherein the actuating mechanism synchronizes with the drive means and includes an actuating member for actuating the contact member and a driving device for driving the actuating member, the actuating member having a first position where the contact member comes into contact with the second stopper means and a second position where the contact member is made away from the second stopper means and brought to the second position when the drive means is started.

17. An image forming apparatus as defined in claim 16 wherein the driving device consists essentially of an electromagnetic solenoid.

18. An image forming apparatus as defined in claim 12 wherein the second stopper means includes a pivotable stopper member.

19. An image forming apparatus as defined in claim 12 wherein:
the drive means includes a drive motor rotatable in a specified direction and conversion mechanism for converting the torque of the drive motor into the driving force for moving the document table to the left or right side;
the movement control means includes switch means for causing the conversion mechanism to convert the torque of the drive motor into movement of the document table to the left from that of the document table to the right when the document table moves to the left up to a first predetermined position, and to convert the torque of the driving motor into movement of the document table to the right from that of the document table to the left when the document table moves to the right up to a second predetermined position;
the switch means includes a clutch mechanism provided between the drive portion and left movement drive portion and between the drive portion and right movement drive portion for coupling the drive portion with either the left or right movement drive portion, a toggle mechanism operable in association with the clutch mechanism, the toggle mechanism including a switch actuator having a first position, a second position, and a third position, and a switch member for switching the position of the switch actuator of the toggle mechanism, the contact member having a position changing portion for changing the position of the switch actuator, the clutch mechanism coupling the drive portion with the left movement drive portion when the switch actuator is switched to the first position by the switch member, coupling the drive portion with the right movement drive portion when the switch actuator is switched to the second position by the switch member, and coupling the drive portion with neither the left movement drive portion nor right movement drive portion when the switch actuator is switched to the third position by the changing portion of the contact member, the changing portion coming into contact with the switch actuator when the contact member comes into contact with the second stopper means.

* * * * *